US008477298B2

(12) United States Patent
Sutherland

(10) Patent No.: US 8,477,298 B2
(45) Date of Patent: Jul. 2, 2013

(54) ANGLE-CLEAVED OPTICAL FIBERS AND METHODS OF MAKING AND USING SAME

(75) Inventor: James Scott Sutherland, Corning, NY (US)

(73) Assignee: Corning Incorporated, Corning, NY (US)

( * ) Notice: Subject to any disclaimer, the term of this patent is extended or adjusted under 35 U.S.C. 154(b) by 607 days.

(21) Appl. No.: 12/570,752

(22) Filed: Sep. 30, 2009

(65) Prior Publication Data
US 2011/0075132 A1    Mar. 31, 2011

(51) Int. Cl.
*G01B 11/26* (2006.01)
*G01C 1/00* (2006.01)

(52) U.S. Cl.
USPC .......................................... 356/138; 356/141

(58) Field of Classification Search
USPC .......................................... 385/141; 356/138
See application file for complete search history.

(56) References Cited

U.S. PATENT DOCUMENTS

| | | | |
|---|---|---|---|
| 3,444,478 A | 5/1969 | Gudmundsen et al. | |
| 4,067,642 A | 1/1978 | King et al. | |
| 4,121,457 A | 10/1978 | Yoshida et al. | |
| 4,130,343 A | 12/1978 | Miller et al. | |
| 4,373,778 A | 2/1983 | Adham | |
| 4,381,137 A | 4/1983 | Berg et al. | |
| 4,381,882 A * | 5/1983 | Sabine | 385/77 |
| 4,516,827 A | 5/1985 | Lance et al. | |
| 4,544,232 A | 10/1985 | Laude | |
| 4,743,084 A | 5/1988 | Manning | |
| 4,766,705 A | 8/1988 | Dholakia | |
| 4,770,485 A | 9/1988 | Buckley et al. | |
| 4,778,241 A | 10/1988 | Haltenorth | |
| 4,921,325 A | 5/1990 | Iri et al. | |
| 4,998,792 A | 3/1991 | Boerstler et al. | |
| 5,029,972 A | 7/1991 | Lukas et al. | |

(Continued)

FOREIGN PATENT DOCUMENTS

| EP | 0429877 A2 | 6/1991 |
|---|---|---|
| EP | 1986027 A1 | 10/2008 |

(Continued)

OTHER PUBLICATIONS

International Search Report for PCT/US2010/050088 mailed May 19, 2011, 2 pages.

(Continued)

*Primary Examiner* — Tarifur Chowdhury
*Assistant Examiner* — Hina F Ayub
(74) *Attorney, Agent, or Firm* — John H. Vynalek

(57) ABSTRACT

Optical fibers comprising a plurality of cleaved facets disposed at one end are disclosed. First and second facets of the plurality of cleaved facets are disposed at different angles. The optical fiber with the plurality of cleaved facets splits light from an optical component between an optical fiber core and a detector such that a portion of the light may be tapped off for monitoring. The first cleaved facet is disposed at a first angle such that a first portion of the light from an optical component is totally internally reflected into the fiber core. A second cleaved facet can be disposed at a second angle that is less than the first angle so that a second portion of light from the optical component refracts through the second facet to a detector. Methods of forming and using angle-cleaved optical fibers having a plurality of cleaved facets are also disclosed.

17 Claims, 9 Drawing Sheets

U.S. PATENT DOCUMENTS

| | | | |
|---|---|---|---|
| 5,050,956 A | | 9/1991 | Carpenter et al. |
| 5,121,457 A | | 6/1992 | Foley et al. |
| 5,162,864 A | | 11/1992 | Haigh |
| 5,359,687 A | | 10/1994 | McFarland et al. |
| 5,384,872 A | | 1/1995 | Jacobs-Cook et al. |
| 5,402,508 A | * | 3/1995 | O'Rourke et al. ............... 385/31 |
| 5,404,417 A | | 4/1995 | Johnson et al. |
| 5,412,748 A | | 5/1995 | Furuyama et al. |
| 5,416,862 A | | 5/1995 | Haas et al. |
| 5,557,695 A | | 9/1996 | Yamane et al. |
| 5,764,832 A | | 6/1998 | Tabuchi et al. |
| 5,831,743 A | * | 11/1998 | Ramos et al. ................. 356/445 |
| 5,930,059 A | * | 7/1999 | Shimada ....................... 359/871 |
| 6,062,741 A | | 5/2000 | Tachigori |
| 6,064,786 A | | 5/2000 | Cunningham et al. |
| 6,081,637 A | * | 6/2000 | Rekow ............................ 385/31 |
| 6,144,791 A | | 11/2000 | Wach et al. |
| 6,154,589 A | | 11/2000 | Kirk et al. |
| 6,157,757 A | | 12/2000 | Giaretta et al. |
| 6,185,346 B1 | | 2/2001 | Asawa et al. |
| 6,205,274 B1 | | 3/2001 | Zhou ................................ 385/38 |
| 6,266,472 B1 | | 7/2001 | Norwood et al. |
| 6,315,464 B1 | | 11/2001 | Plickert et al. |
| 6,330,382 B1 | | 12/2001 | Harshbarger et al. |
| 6,445,838 B1 | | 9/2002 | Caracci et al. |
| 6,445,854 B1 | | 9/2002 | Miller ............................... 385/38 |
| 6,456,766 B1 | | 9/2002 | Shaw et al. |
| 6,491,447 B2 | | 12/2002 | Aihara |
| 6,501,884 B1 | | 12/2002 | Golowich et al. |
| 6,504,107 B1 | | 1/2003 | Kragl |
| 6,530,697 B1 | | 3/2003 | Johnson et al. |
| 6,556,329 B1 | | 4/2003 | Simcoe et al. |
| 6,597,835 B2 | | 7/2003 | Jie et al. |
| 6,672,773 B1 | | 1/2004 | Glenn et al. |
| 6,724,959 B1 | | 4/2004 | Takahashi et al. |
| 6,754,427 B2 | | 6/2004 | Steinberg et al. |
| 6,792,178 B1 | | 9/2004 | Zhou |
| 6,810,195 B2 | | 10/2004 | Bhagavatula et al. |
| 6,816,653 B2 | | 11/2004 | Botet et al. |
| 6,822,190 B2 | | 11/2004 | Smithson et al. |
| 6,837,654 B2 | | 1/2005 | Serrano |
| 6,848,839 B2 | | 2/2005 | Steinberg |
| 6,928,226 B2 | | 8/2005 | Caracci et al. |
| 7,218,804 B2 | | 5/2007 | Brenner et al. |
| 7,228,032 B2 | | 6/2007 | Blauvelt et al. |
| 7,245,811 B2 | | 7/2007 | Takeda et al. |
| 7,254,300 B2 | | 8/2007 | Nishie et al. |
| 7,283,701 B2 | | 10/2007 | Hallemeier et al. |
| 7,400,797 B2 | | 7/2008 | Bhagavatula et al. |
| 7,477,815 B2 | | 1/2009 | Jenkins et al. |
| 2002/0057883 A1 | | 5/2002 | Malone et al. |
| 2002/0097974 A1 | | 7/2002 | Matsumoto et al. |
| 2002/0181899 A1 | | 12/2002 | Tartaglia et al. |
| 2003/0072525 A1 | | 4/2003 | Sjodin |
| 2004/0114874 A1 | | 6/2004 | Bono et al. |
| 2004/0184492 A1 | | 9/2004 | Windover |
| 2004/0190851 A1 | | 9/2004 | Garner et al. |
| 2005/0025430 A1 | | 2/2005 | Bhagavatula et al. |
| 2005/0129367 A1 | | 6/2005 | Koshinz et al. |
| 2006/0002651 A1 | | 1/2006 | Shimizu et al. ................. 385/14 |
| 2006/0045427 A1 | | 3/2006 | Sano et al. |
| 2006/0045452 A1 | | 3/2006 | Williams |
| 2008/0246957 A1 | * | 10/2008 | Beranek ....................... 356/73.1 |
| 2008/0260379 A1 | * | 10/2008 | Beranek .......................... 398/21 |
| 2009/0010596 A1 | | 1/2009 | Matthijsse et al. |

FOREIGN PATENT DOCUMENTS

| | | | |
|---|---|---|---|
| JP | 59046616 | | 3/1984 |
| JP | 2009-98338 | A | 5/2009 |
| WO | 9506270 | A2 | 3/1995 |
| WO | 9733390 | A1 | 9/1997 |
| WO | WO 98/55891 | A1 | 12/1998 |
| WO | 2004010190 | A1 | 1/2004 |
| WO | 2004055568 | A1 | 7/2004 |
| WO | WO 2004/063784 | A1 | 7/2004 |
| WO | 2004095101 | A1 | 11/2004 |
| WO | WO 2008/092112 | A2 | 7/2008 |

OTHER PUBLICATIONS

Non-final Office Action for U.S. Appl. No. 12/570,714 mailed May 24, 2012, 9 pages.

Advisory Action for U.S. Appl. No. 12/570,714 mailed Mar. 8, 2012, 3 pages.

Final Office Action for U.S. Appl. No. 12/570,714 mailed Dec. 23, 2011, 10 pages.

Non-final Office Action for U.S. Appl. No. 12/570,714 mailed Jul. 14, 2011, 9 pages.

Advisory Action for U.S. Appl. No. 12/570,714 mailed Feb. 22, 2011, 3 pages.

Final Office Action for U.S. Appl. No. 12/570,714 mailed Nov. 29, 2010, 12 pages.

Non-final Office Action for U.S. Appl. No. 12/570,714 mailed Jun. 16, 2010, 9 pages.

Non-final Office Action for U.S. Appl. No. 12/579,473 mailed Sep. 30, 3011, 5 pages.

\* cited by examiner

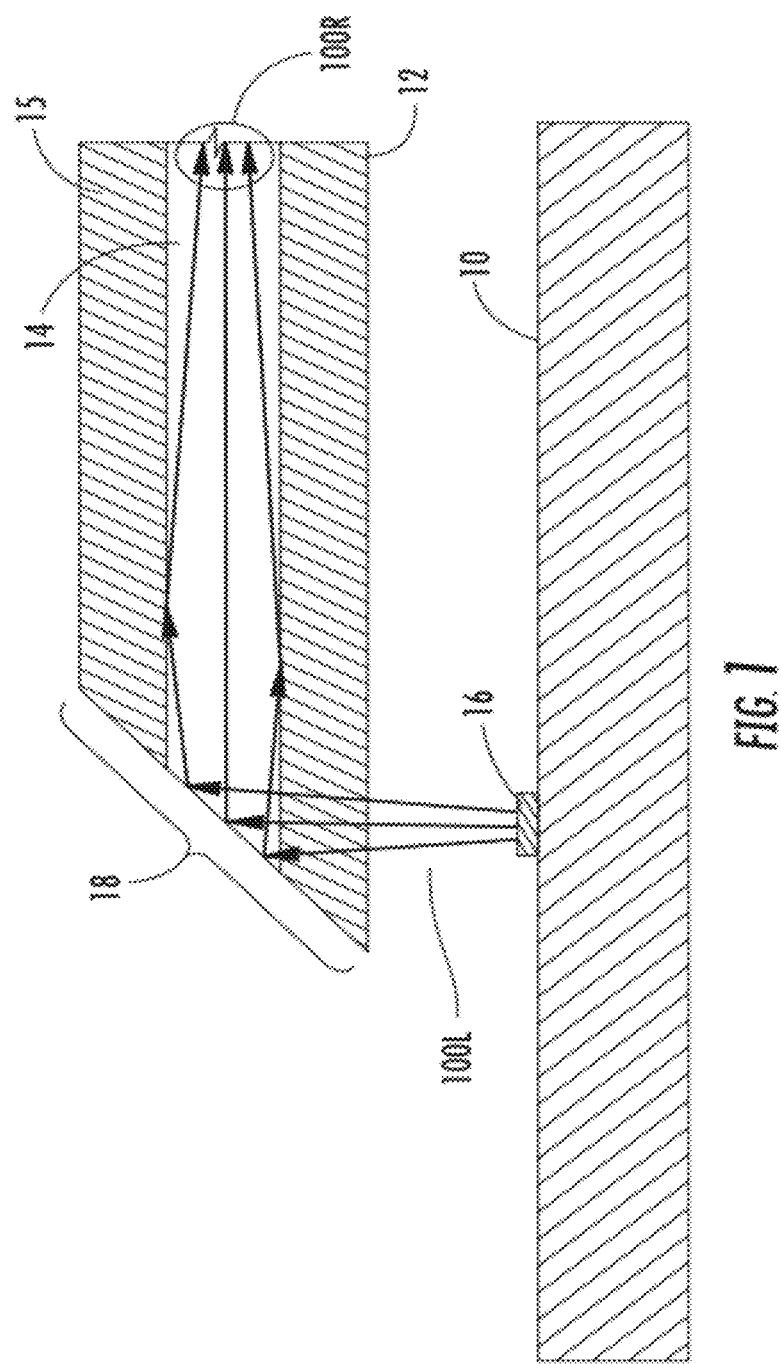

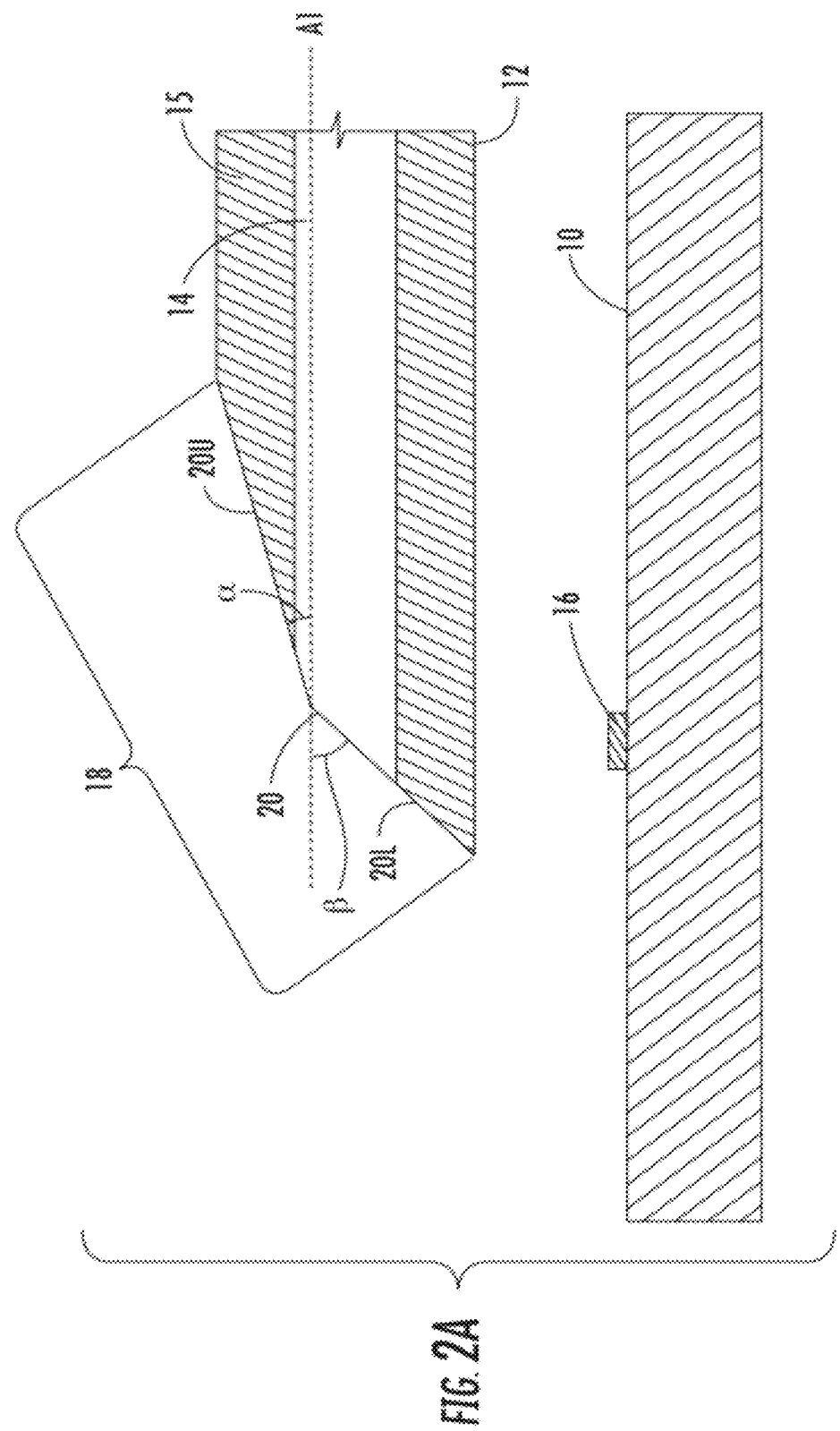

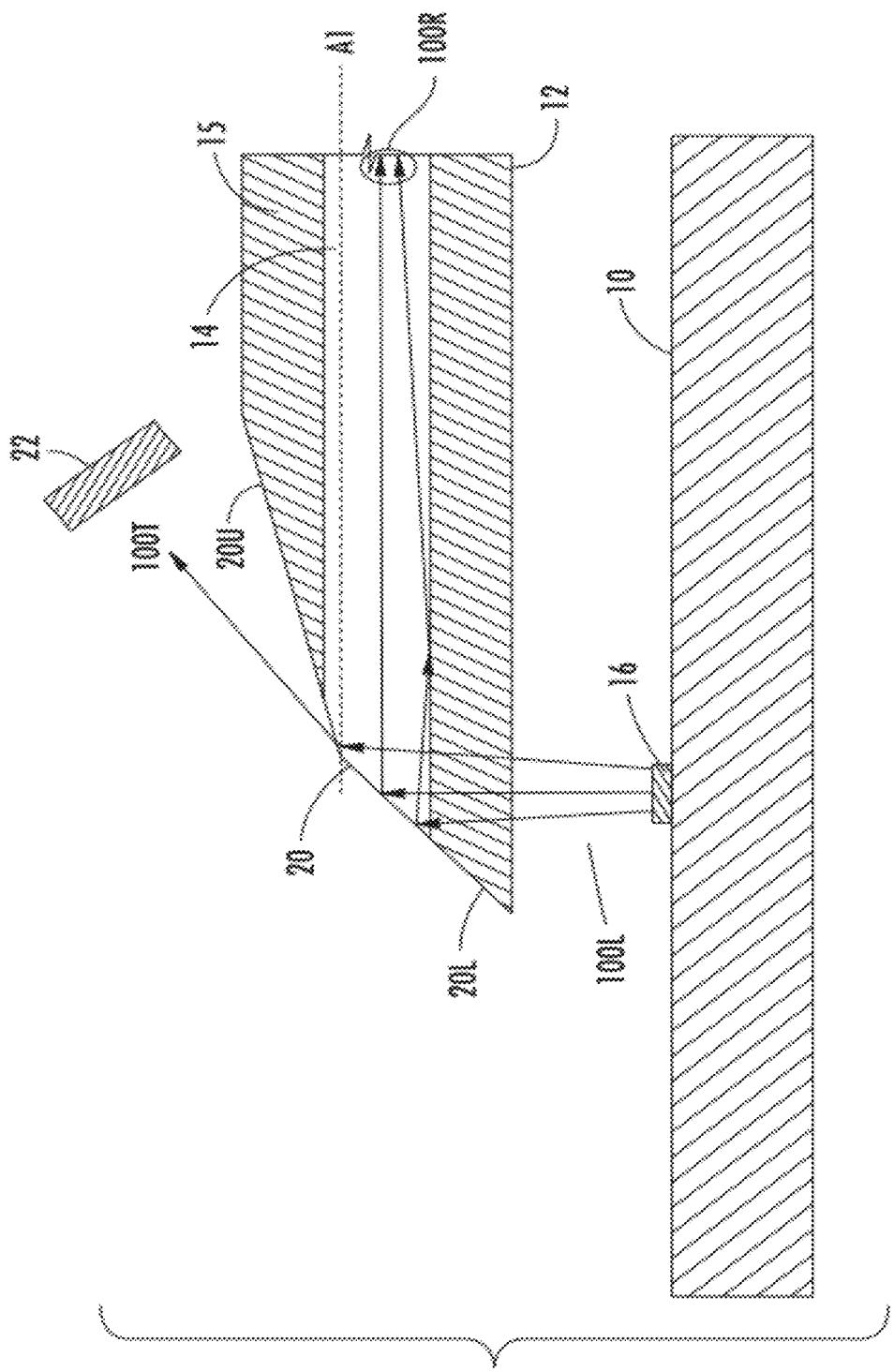

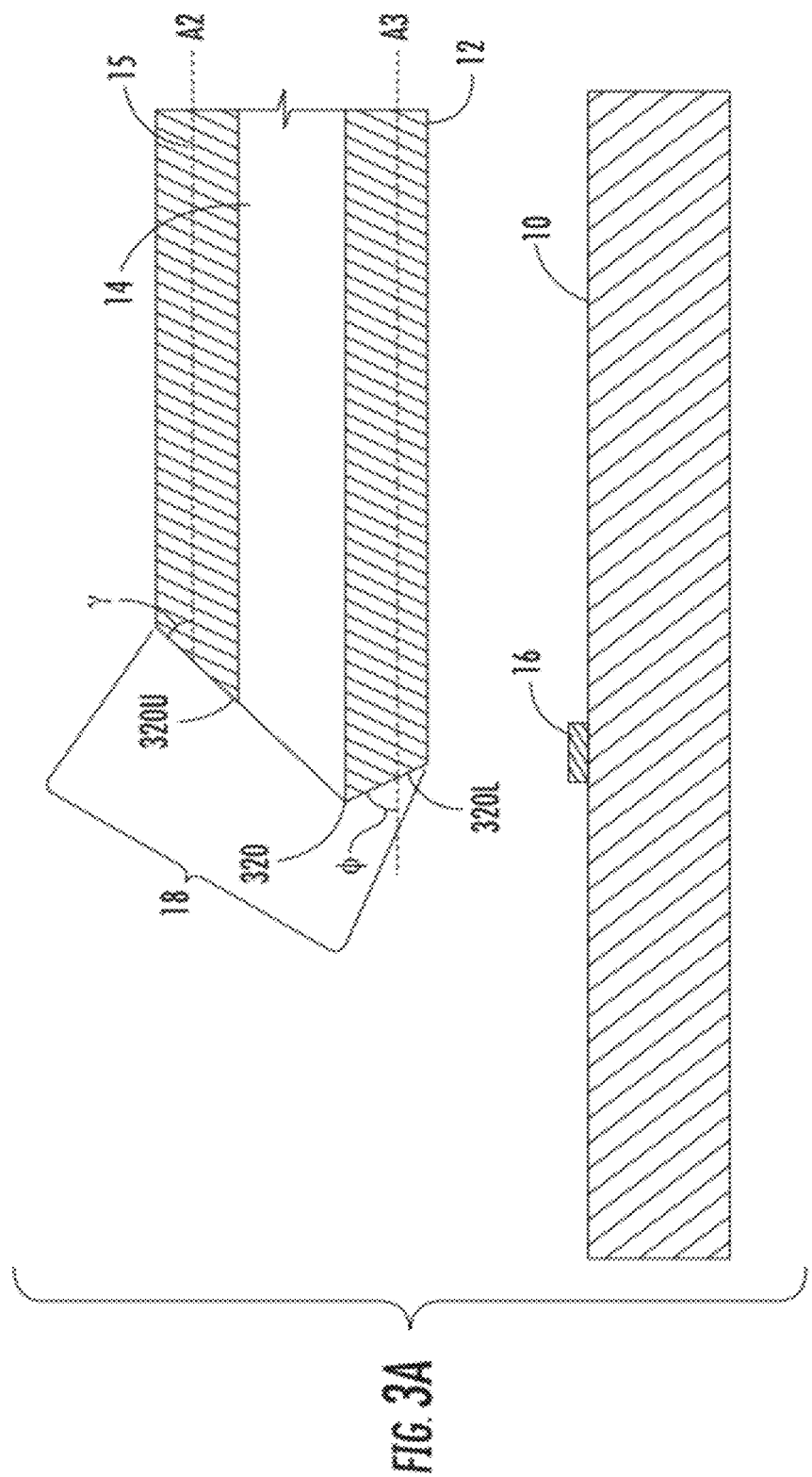

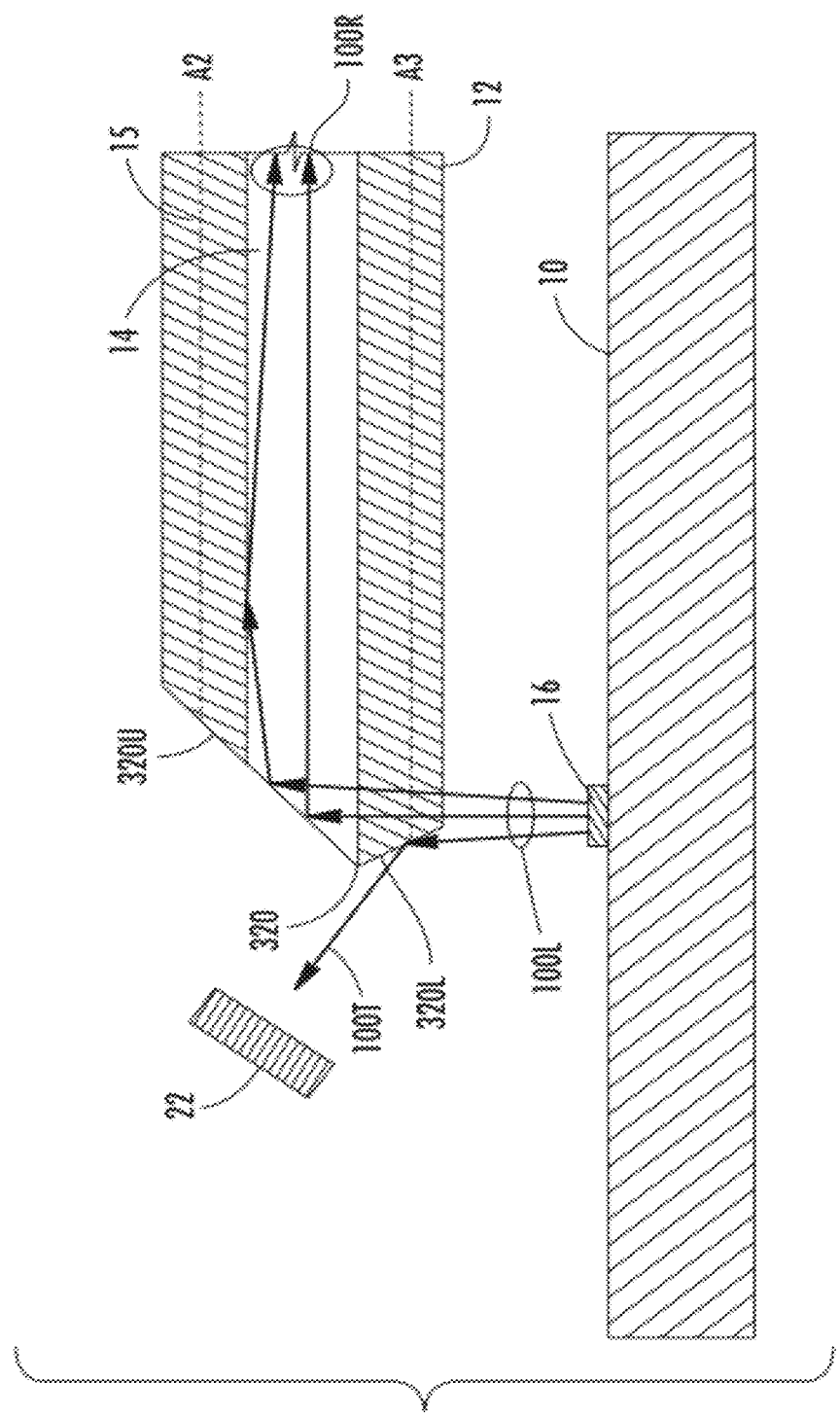

ANGLE-CLEAVED OPTICAL FIBERS AND METHODS OF MAKING AND USING SAME

BACKGROUND

1. Field of the Disclosure

The technology of the disclosure relates to optical fibers, and in particular, angle-cleaved optical fibers for use in monitoring of optical light sources.

2. Technical Background

Optical fibers can be used to transmit or process light in a variety of applications. Examples include delivering light to or receiving light from integrated optical components or devices formed on substrates, transmitting information channels in wavelength-division multiplexed optical communication devices and systems, forming fiber optic switch matrix devices or fiber array to array connectors, and producing optical gain for optical amplification or laser oscillation. Optical fibers essentially operate as "light pipes" to confine light within the fiber boundary and transfer light from one point to another.

A typical optical fiber may be simplified as having an optical fiber core and a cladding layer surrounding the optical fiber core. The refractive index of the optical fiber core is higher than that of the cladding to confine the light. Light rays coupled into the optical fiber core within a maximum angle with respect to the longitudinal axis of the optical fiber core are totally internally reflected at the interface of the optical fiber core and the cladding. Total internal reflection (TIR) is an optical phenomenon that occurs when a ray of light strikes a medium boundary at an angle larger than the critical angle with respect to the normal to the surface. If the refractive index of the material on the other side of the boundary is lower, no light can pass through and all of the light is reflected. The critical angle is the angle of incidence above which the total internal reflection occurs. This TIR spatially confines the optical energy of the light rays in one or more selected optical fiber modes to guide the optical energy along the optical fiber core.

Optical links for short distance applications (e.g., <1 km) may employ multimode optical fibers for relaxed alignment tolerances to sources and detectors. The large size of the multimode optical fiber core makes the optical interconnections highly tolerant of lateral, angular and axial misalignments with respect to Fabry-Perot or Vertical Cavity Surface Emitting Laser (VCSEL) laser sources. For this and other reasons, it is sometimes desired to monitor the amount of light propagating in an optical fiber. For example, eye safety requirements for a given optical link may dictate that optical fiber power levels not exceed a predefined maximum level. At the same time, the optical power received at the detector should be greater than a desired minimum level to avoid or minimize bit errors due to detector noise. Optical sources launch an optical signal into the optical fiber at power levels to keep the link optical power at a power level between desired maximum and minimum levels. Moreover, as lasers age, the amount of light they produce may slowly change under constant laser drive conditions. A solution in source-to-fiber coupling applications involves positioning a detector near the laser source to monitor the light coming from the laser source. A fraction of the optical power is directed to the detector to monitor output power levels over the life of the laser.

It is desired to have a scheme for monitoring the amount of light propagating in an optical fiber that may be employed at an arbitrary location along an optical fiber and that may be implemented in a compact form.

SUMMARY OF THE DETAILED DESCRIPTION

Embodiments disclosed in the detailed description include at least one optical fiber comprising a plurality of cleaved facets disposed at an end of the optical fiber. An upper one of the plurality of cleaved facets is disposed or formed at a different angle with respect to a longitudinal axis of the optical fiber than a lower one of the plurality of cleaved facets. The optical fiber has at one end an angled face having upper and lower cleaved facets that split light from a light beam between a core of the optical fiber and a detector. The first one of the cleaved facets of the angled face of the end of the optical fiber is disposed or formed at a first angle so that light from an optical component striking the first facet is totally internally reflected into the optical fiber core. The second cleaved facet is disposed or formed at a second angle that is less than the first angle with respect to the longitudinal axis of the optical fiber, so that a portion of the light from the optical component refracts through the second facet and onto the detector.

The optical fiber having at one end an angled face having a plurality of cleaved facets may be used to split light from a light beam from an optical light source to a detector such that the light from the optical light source may be tapped off for monitoring purposes. The light detected at the detector can be measured and used for various purposes, including but not limited to, alignment of an optical fiber with respect to the optical light source and optical attenuation of the optical light source. Such a tap design allows for a compact packaging approach, with optical light sources, such as VCSELs, and detectors to be in close proximity within a compact package.

Other embodiments disclosed in the detailed description include a method of forming an angle-cleaved optical fiber having a plurality of cleaved facets. The method includes cleaving an end of an optical fiber at a first angle to form a first angle-cleaved facet at the end of the optical fiber. The method also includes cleaving the end of the optical fiber at a second angle to form a second angle-cleaved facet at the end of the optical fiber, wherein the first angle is different than the second angle.

Another embodiment disclosed herein includes a method of monitoring an optical light source on a substrate. Light is directed from the optical light source to an optical fiber having at least one angle-cleaved end. Light is reflected by a bottom surface of the optical fiber to a detector located on the substrate proximate the optical light source. A first portion of the light from the optical light source is TIR reflected by the bottom surface of the optical fiber. This first portion of light may be detected at a first detector located on the substrate proximate the optical light source. A second portion of light from the optical light source is Fresnel reflected by the bottom surface of the optical fiber. This second portion of light may be detected at a second detector located on the substrate proximate the optical light source.

Other embodiments include another method of monitoring an optical light source. Light is directed from the optical light source to an optical fiber having at least one angle-cleaved end. Light is reflected by the angle-cleaved end of the optical fiber and is detected at a detector. In one embodiment, the optical fiber further comprises a plurality of cleaved facets disposed at the angle-cleaved end of the optical fiber. An upper one of the plurality of cleaved facets is disposed or formed at a different angle with respect to a longitudinal axis of the optical fiber than a lower one of the plurality of cleaved facets.

Additional features and advantages will be set forth in the detailed description which follows, and in part will be readily apparent to those skilled in the art from that description or recognized by practicing the embodiments as described herein, including the detailed description that follows, the claims, as well as the appended drawings.

It is to be understood that both the foregoing general description and the following detailed description present embodiments, and are intended to provide an overview or framework for understanding the nature and character of the disclosure. The accompanying drawings are included to provide a further understanding, and are incorporated into and constitute a part of this specification. The drawings illustrate various embodiments, and together with the description serve to explain the principles and operation of the concepts disclosed.

BRIEF DESCRIPTION OF THE FIGURES

FIG. 1 is a cross-sectional side view of an exemplary substrate having an optical light source that launches light into an exemplary angle-cleaved optical fiber;

FIG. 2A is a cross-sectional side view of an exemplary embodiment of an optical fiber having two angle-cleaved facets disposed on an end of the optical fiber;

FIG. 2B is a cross-sectional side view illustrating an exemplary embodiment of the optical fiber of FIG. 2A splitting light from an optical light source on a substrate;

FIG. 3A is a cross-sectional side view of another exemplary embodiment of an optical fiber having two angle-cleaved facets disposed on an end of the optical fiber;

FIG. 3B is a cross-sectional side view illustrating an exemplary embodiment of the optical fiber of FIG. 3A splitting light from an optical light source on a substrate;

DETAILED DESCRIPTION OF THE PREFERRED EMBODIMENTS

Figure 4:
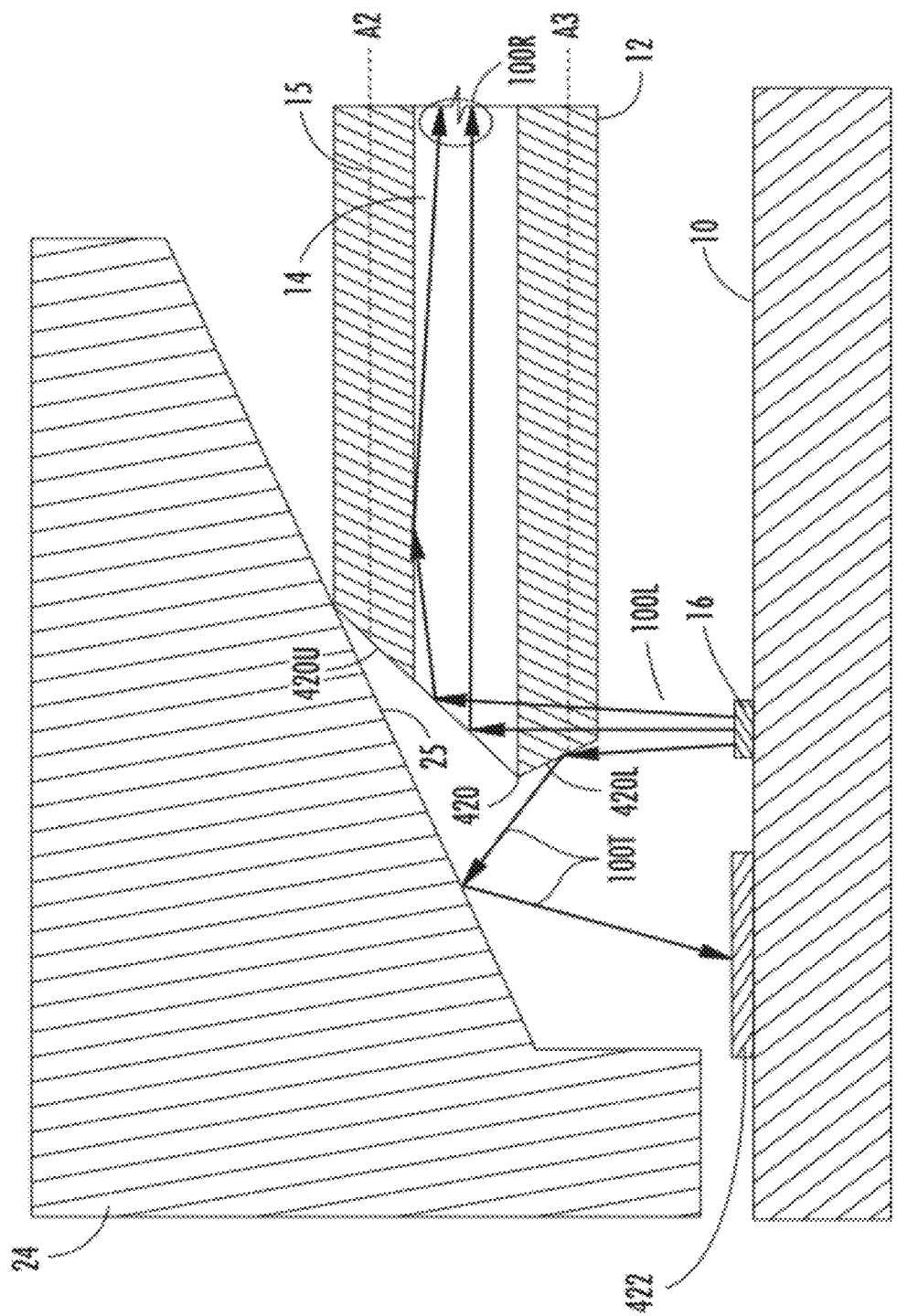
FIG. 4 is a cross-sectional side view of an exemplary embodiment of an optical fiber having two angle-cleaved facets disposed on an end of the optical fiber splitting light from an optical light source on a substrate via reflection of an interior surface of a molded cap.

Reference will now be made in detail to the embodiments, examples of which are illustrated in the accompanying drawings, in which some, but not all embodiments are shown. Indeed, the concepts may be embodied in many different forms and should not be construed as limiting herein; rather, these embodiments are provided so that this disclosure will satisfy applicable legal requirements. Whenever possible, like reference numbers will be used to refer to like components or parts.

Embodiments disclosed in the detailed description include at least one optical fiber comprising a plurality of cleaved facets disposed at an end of the optical fiber. An upper one of the plurality of cleaved facets is disposed or formed at a different angle with respect to a longitudinal axis of the optical fiber than a lower one of the plurality of cleaved facets. The optical fiber has at one end an angled face having upper and lower cleaved facets that split light from a light beam between a core of the optical fiber and a detector. The first one of the cleaved facets of the angled face of the end of the optical fiber is disposed or formed at a first angle so that light from an optical component striking the first facet is totally internally reflected into the optical fiber core. The second cleaved facet is disposed or formed at a second angle that is less than the first angle with respect to the longitudinal axis of the optical fiber, so that a portion of the light from the optical component refracts through the second facet and onto the detector.

The optical fiber having at one end an angled face having upper and lower cleaved facets may be referred to as a multi-faceted angle-cleaved optical fiber. The multi-faceted angle-cleaved optical fiber may be used to help monitor the light from an optical light source, such as a laser for example, by tapping off a portion of the light from the optical light source. In one embodiment, the optical light source may be a Vertical Cavity Surface Emitting Laser (VCSEL) laser source. To monitor the amount of light propagating in an optical system, a detector is positioned near the optical light source to monitor the light coming from the light source. A fraction of the optical power is directed to the detector to monitor output power levels over the life of the laser. The multi-faceted angle-cleaved optical fiber functions to split light from a light beam launched by the optical light source into two portions, where one portion is directed into an internal core of the optical fiber and one portion is directed to a detector. One of the facets of the angled face of the end of the optical fiber is disposed or formed at a first angle so that light from an optical component is totally internally reflected into the optical fiber core. The second facet is disposed or formed at a second angle that is less than the first angle with respect to the longitudinal axis of the optical fiber so that a portion of the light from the optical component refracts through this facet and onto the detector.

FIG. 1 provides a cross-sectional side view of one embodiment of a laser angle-cleaved optical fiber where light from an optical light source on a substrate is launched, or directed, into the laser angle-cleaved optical fiber. In this regard, a substrate 10 has an optical light source 16 disposed thereon. The optical light source 16 may be a VCSEL or other optical source. An optical fiber 12 having an internal core 14, cladding 15, and an end 18 is provided. The end 18 of the optical fiber 12 may be angled. In one embodiment, the end 18 is cleaved at an angle via a laser (e.g., laser-cleaved) (hereafter referred to as end 18, a cleaved fiber end 18, or an angle-cleaved fiber end 18, or a laser-cleaved fiber end 18). The optical fiber 12 is positioned such that the cleaved fiber end 18 is aligned with the optical light source 16 to receive light from the optical light source 16. The angle of the cleaved fiber end 18 may be provided such that light 100L directed from the optical light source 16 may be reflected via Total Internal Reflection (TIR) at the cleaved fiber end 18 and redirected down the internal core 14 of the optical fiber 12 as light 100R. In one embodiment, the angle of the cleaved fiber end 18 may be approximately forty-five (45) degrees, or other angles relative to an axis of the optical fiber 12 that provide improved optical performance (e.g., reduced back reflection, increased bandwidth in multimode fibers, etc.). The light 100R generally remains in the internal core 14 as it propagates along the optical fiber 12.

Angled facets on optical fiber ends may be formed using laser processing according to known methods. A laser cleaving station consisting of a carbon-dioxide ($CO_2$) laser with a variable beam expander and a 25 millimeter focal length focusing lens may be used. Thus, when the optical fibers are cleaved using a laser, the optical fibers or ends of optical fibers may also be referred to as laser-cleaved fibers, or laser-cleaved ends. The laser process may be used to form an angled facet on a single optical fiber or on a group of optical fibers arranged in a one-dimensional (1-D) or two-dimensional (2-D) array. An optical fiber having a laser-cleaved end with an angle can be used for many purposes. For example, a VCSEL emits a light beam vertically and therefore a right angle, or 90 degree, turn is often necessary out of compactness considerations for certain applications. The optical fiber having a laser-cleaved end with an angle can be used to achieve the needed right angle turn of the light from the VCSEL, as shown above in FIG. 1.

In an alternative to the laser cleaving process, the angled facets on the optical fiber ends may be formed on individual optical fibers or optical fiber arrays via precision polishing operations.

The ability of angled facets on optical fiber ends to reflect light can also be used to monitor the light coming from an optical light source by splitting off a portion of the light from an optical light source and directing the split off portion to a detector. In one embodiment, this is accomplished by integrating an optical splitter into an optical fiber end via the formation of multiple cleaved facets on the end of the optical fiber, as shown in FIGS. 2A and 2B.

FIG. 2A is a cross-sectional side view of an exemplary embodiment of an optical fiber having two angle-cleaved facets. An optical fiber 12 having at one end an angled face having a plurality of cleaved facets may be used to split light from a light beam from an optical light source to a detector such that the light from the optical light source may be tapped off for monitoring purposes. FIG. 2A shows an optical fiber 12 having an internal core 14 aligned over an optical light source 16 on a substrate 10. The optical fiber 12 is cleaved at an end 18 such that the optical fiber 12 has upper and lower cleaved facets 20U and 20L. In one embodiment, the upper and lower cleaved facets 20U and 20L are formed by making a pair of laser-cleaved cuts through a point on the end 18 of the optical fiber 12 using a $CO_2$ laser, as described above. In this embodiment, a first laser-cleaved cut may be at a first angle α with respect to a longitudinal axis A1 of the optical fiber 12 to form the upper cleaved facet 20U. A second laser-cleaved cut is then made at a second angle β to form the lower cleaved facet 20L. It should be understood that the order of the cuts are not important, and the first laser-cleaved cut could have been at angle β with respect to the longitudinal axis A1 to form the lower cleaved facet 20L. In the embodiment of FIG. 2A, the angle β of the lower cleaved facet 20L will be relatively steep (for example, forty-five (45) degrees or greater) with respect to the longitudinal axis A1. The angle α of the upper cleaved facet 20U will be less than angle β. Angle α may be in the range of fifteen (15) to thirty (30) degrees. In addition, other methods to form the upper and lower cleaved facets 20U and 20L may be used. At the end of the cleaving process, the optical fiber 12 in the embodiment illustrated in FIG. 2A has upper and lower cleaved facets 20U and 20L, such that the end of the optical fiber 12 below a point 20 is angled at β degrees with respect to longitudinal axis A1, and the end of the optical fiber 12 above the point 20 is angled at α degrees with respect to longitudinal axis A1.

FIG. 2B is a cross-sectional side view illustrating an exemplary embodiment of the optical fiber 12 of FIG. 2A splitting light from an optical light source on a substrate. An optical fiber 12 having at one end an angled face having a plurality of cleaved facets may be used to split light from a light beam from an optical light source to a detector such that the light from the optical light source may be tapped off for monitoring purposes, as illustrated in FIG. 2B. The optical fiber 12 having an internal core 14 is positioned over an optical light source 16 on a substrate 10. The upper and lower cleaved facets 20U and 20L on the end 18 of the optical fiber 12 are oriented at different angles relative to a beam of light 100L launched from an optical light source 16. The light 100L may be a diverging beam of light in one embodiment. The upper and lower cleaved facets 20U and 20L serve to split light from the light beam 100L between the internal core 14 of the optical fiber 12 and a detector 22, such as a photodetector. In the embodiment illustrated in FIG. 2B, the detector 22 is located above the optical fiber 12. The lower cleaved facet 20L is disposed or formed at a relatively steep angle (e.g., forty-five (45) degrees or greater, as indicated by angle β in FIG. 2A) so that the light 100L from the optical light source 16 arranged below the optical fiber 12 is TIR reflected into the internal core 14 of the optical fiber 12 as light 100R. The upper cleaved facet 20U is disposed or formed at a smaller angle than angle β (e.g., in a range of fifteen (15) to thirty (30) degrees, as indicated by angle α in FIG. 2A) so that a portion of the light 100L refracts through the upper cleaved facet 20U and onto the detector 22 arranged above the optical fiber 12. The lower cleaved facet 20L is angled so that the light 100L from the optical light source 16 that strikes the lower cleaved facet 20L is TIR reflected into the internal core 14 as light 100R at an angle roughly parallel to the longitudinal axis of the optical fiber 12. The upper cleaved facet 20U is angled at a slightly different angle relative to the lower cleaved facet 20L so that the light 100L that strikes the upper cleaved facet 20U refracts out of the fiber as light 100T. This light 100T propagates to the detector 22 that is positioned above the optical fiber 12. In this manner, a portion of the light 100L from the optical light source 16 is tapped off as the light 100T to the detector 22 so that it can be used to monitor the light from the optical light source 16.

In one embodiment, the upper cleaved facet 20U is disposed or formed to be as wide as possible. This allows as small an amount of the light 100L as possible to be tapped off as the light 100T to the detector 22 and still be able to accurately monitor the light from the optical light source 16. The angle of the lower cleaved facet 20L may be chosen such that the majority of the light 100L is contained within the internal core 14 of the optical fiber 12. The particular angles of the upper and lower cleaved facets 20U and 20L can be determined using Brewster's Angle, which is an angle of incidence at which light with a particular polarization is perfectly transmitted through a surface with no reflection. There is no Brewster's Angle for light that strikes a surface at a perpendicular angle.

With simple trigonometry, this condition can be expressed as:

$\theta_1 + \theta_2 = 90$ degrees, where $\theta_1$ is the angle of incidence and $\theta_2$ is the angle of refraction.

Snell's law states that the ratio of the sines of the angles of incidence and of refraction is a constant that depends on the media. In particular, Snell's law states that the ratio of the sines of the angles of incidence and refraction is equivalent to the ratio of velocities in the two media, or equivalent to the opposite ratio of the indices of refraction. Thus, using Snell's Law, the incident angle $\theta_1 = \theta_B$ at which no light is reflected can be calculated to be $\theta_B = \arctan(n_1/n_2)$, where $n_1$ and $n_2$ are the refractive indices of the two media.

In addition, in one embodiment, the corner of the laser-cleaved facets 20U and 20L (i.e., at point 20), is made as sharp as possible during the cleaving process.

In the embodiment of FIG. 2B, an individual optical fiber 12 is illustrated. However, laser angle-cleaved fiber ends may be disposed or formed on individual fibers or arrays of fibers.

Thus, in other embodiments, single or multiple facets may be disposed or formed on the ends of arrayed optical fibers in addition to individual optical fibers.

In other embodiments, the optical fiber 12 having multiple cleaved facets at one end, such as the optical fiber 12 of FIGS. 2A and 2B, may also be used to simplify alignment of the optical fiber 12 to the optical light source 16 during assembly. The measurement of power of the light from the optical light source 16 at a detector can provide a local indication of when an end of the optical fiber 12 is properly positioned relative to the optical light source 16.

In other embodiments, the detector 22 can be positioned in other locations, depending on the specific configuration of the cleaved facets on the end of the optical fiber 12, and on the size and power of the optical light source 16. In general, the smaller the optical light source 16, the closer the detector 22 should be to the reflected light 100T.

FIG. 3A is a cross-sectional side view of another exemplary embodiment of an optical fiber having two angle-cleaved facets. An optical fiber 12 having at one end an angled face having a plurality of cleaved facets may be used to split light from a light beam from an optical light source to a detector such that the light from the optical light source may be tapped off for monitoring purposes. An optical fiber 12 having an internal core 14 is positioned over an optical light source 16 on a substrate 10. The optical fiber 12 is cleaved at an end 18 such that optical fiber 12 has upper and lower cleaved facets 320U and 320L. The upper and lower cleaved facets 320U and 320L may be disposed or formed by making a pair of laser-cleaved cuts through a point on the end 18 of optical fiber 12 using a $CO_2$ laser, as described above. In this embodiment, a first laser-cleaved cut may be at a first angle $\gamma$ with respect to a longitudinal axis A2 of the optical fiber 12 to fowl the upper cleaved facet 320U. A second laser-cleaved cut is then made in the opposite direction from the first cut, at a second angle $\phi$ with respect to axis A3, to form the lower cleaved facet 320L. Axis A2 and axis A3 are parallel to each other and are parallel to a longitudinal axis of the optical fiber 12. It should be understood that ordering of the cuts is not required. The first laser-cleave may be cut at an angle $\phi$ to form the lower cleaved facet 320L. In addition, other methods to form the upper and lower cleaved facets 320U and 320L may be used. At the end of the cleaving process, the optical fiber 12 in the embodiment illustrated in FIG. 3A has upper and lower cleaved facets 320U and 320L such that the end of the optical fiber 12 below the point 320 is angled in one direction at $\phi$ degrees with respect to axis A3, and the end of optical fiber 12 above point 320 is angled in the opposite direction at $\gamma$ degrees with respect to axis A2.

FIG. 3B is a cross-sectional side view illustrating an exemplary embodiment of the optical fiber of FIG. 3A splitting light from an optical light source on a substrate. An optical fiber 12 having at one end an angled face having a plurality of cleaved facets may be used to split light from a light beam from an optical light source to a detector such that the light from the optical light source may be tapped off for monitoring purposes. The optical fiber 12 having an internal core 14 is positioned over an optical light source 16 on a substrate 10. As seen in FIG. 3B, the upper cleaved facet 320U is angled (at $\gamma$ degrees with respect to axis A2, as shown in FIG. 3A), so that the light 100L from the optical light source 16 is TIR reflected as light 100R into the internal core 14 of the optical fiber 12. The lower cleaved facet 320L is angled in the opposite direction from the upper cleaved facet 320U (at $\phi$ degrees with respect to axis A3, as shown in FIG. 3A). In this manner, the light 100L from the optical light source 16 strikes the lower cleaved facet 320L and reflects away from the end of the optical fiber 12 as light 100T. In the embodiment of FIG. 3B, a detector 22 can be positioned at the end of the optical fiber 12 rather than above the optical fiber 12, as provided in the embodiment of FIG. 2B. The detector 22 may be positioned at any point along the path of the reflected light 100T. The reflected light 100T can then be used as an optical tap signal to monitor the light from the optical light source 16.

It may also be desirable to mount an optical detector on the same substrate as the optical light source. This configuration may simplify packaging and assembly of the optical devices. In addition, this configuration may enable a common active optical device wirebonding approach and simplify electrical connectors among electronic components. FIG. 4 provides such a tap detector solution, where the detector is mounted on the same substrate as the optical light source.

FIG. 4 is a cross-sectional side view of an exemplary embodiment of an optical fiber having two angle-cleaved facets splitting light from an optical light source on a substrate via reflection of an interior surface of a molded cap. The optical fiber 12 having an internal core 14 is positioned over an optical light source 16 on a substrate 10. The end of the optical fiber 12 in FIG. 4 is laser angle-cleaved similar to the optical fiber 12 of FIGS. 3A and 3B. In FIG. 4, the optical fiber 12 is cleaved at one end such that the optical fiber 12 has upper and lower cleaved facets 420U and 420L. The upper and lower cleaved facets 420U and 420L may be disposed or formed by making a pair of laser-cleaved cuts through a point on the end of the optical fiber 12 using a $CO_2$ laser, as described above. At the end of the cleaving process, the optical fiber 12 in the embodiment illustrated in FIG. 4 has upper and lower cleaved facets 420U and 420L, such that the end of the optical fiber 12 below a point 420 is angled in one direction with respect to axis A3, and the end of the optical fiber 12 above the point 420 is angled in the opposite direction at a different angle with respect to axis A2. Axis A2 and axis A3 are parallel to each other and are parallel to a longitudinal axis of the optical fiber 12, as in FIGS. 3A and 3B.

As seen in FIG. 4, the upper cleaved facet 420U is angled so that light 100L from the optical light source 16 is TIR reflected as light 100R into the internal core 14 of the optical fiber 12, in the same manner discussed above with respect to FIG. 3B. The lower cleaved facet 420L is angled in the opposite direction from the upper cleaved facet 420U and at a different angle so that the light 100L from the optical light source 16 strikes the lower cleaved facet 420L and reflects away from the end of the optical fiber 12 as light 100T, in the same manner discussed above with respect to FIG. 3B.

However, in the embodiment of FIG. 4, a molded cap 24 is positioned over the optical fiber 12 (or optical fiber array) to hold the optical fiber 12 in place. In one embodiment, the molded cap 24 may be a gripper structure of the type disclosed in concurrently filed application Ser. No. 12/570,714, entitled "SUBSTRATES AND GRIPPERS FOR OPTICAL FIBER ALIGNMENT WITH OPTICAL ELEMENT(S) AND RELATED METHODS," which is hereby incorporated by reference in its entirety. The molded cap 24 may be composed of a plastic or polymeric material. The molded cap 24 may also provide an interior reflecting surface 25. Light 100T is reflected off the lower facet 420L onto the molded cap 24. The interior reflecting surface 25 of the molded cap 24 guides the reflected light 100T into a detector 422. The interior reflecting surface 25 of the molded cap 24 can be metalized or coated with some other reflective or scattering material to guide the light 100T to the detector 422. The detector 422 may be positioned on the same substrate 10 as the optical light source 16, may be positioned at any point on the substrate 10 in the path of the reflected light 100T from the molded cap 24, and may be positioned proximate the optical light source 16. The light 100T can then be used as an optical tap signal to monitor the light from the optical light source 16.

Figure 5A:
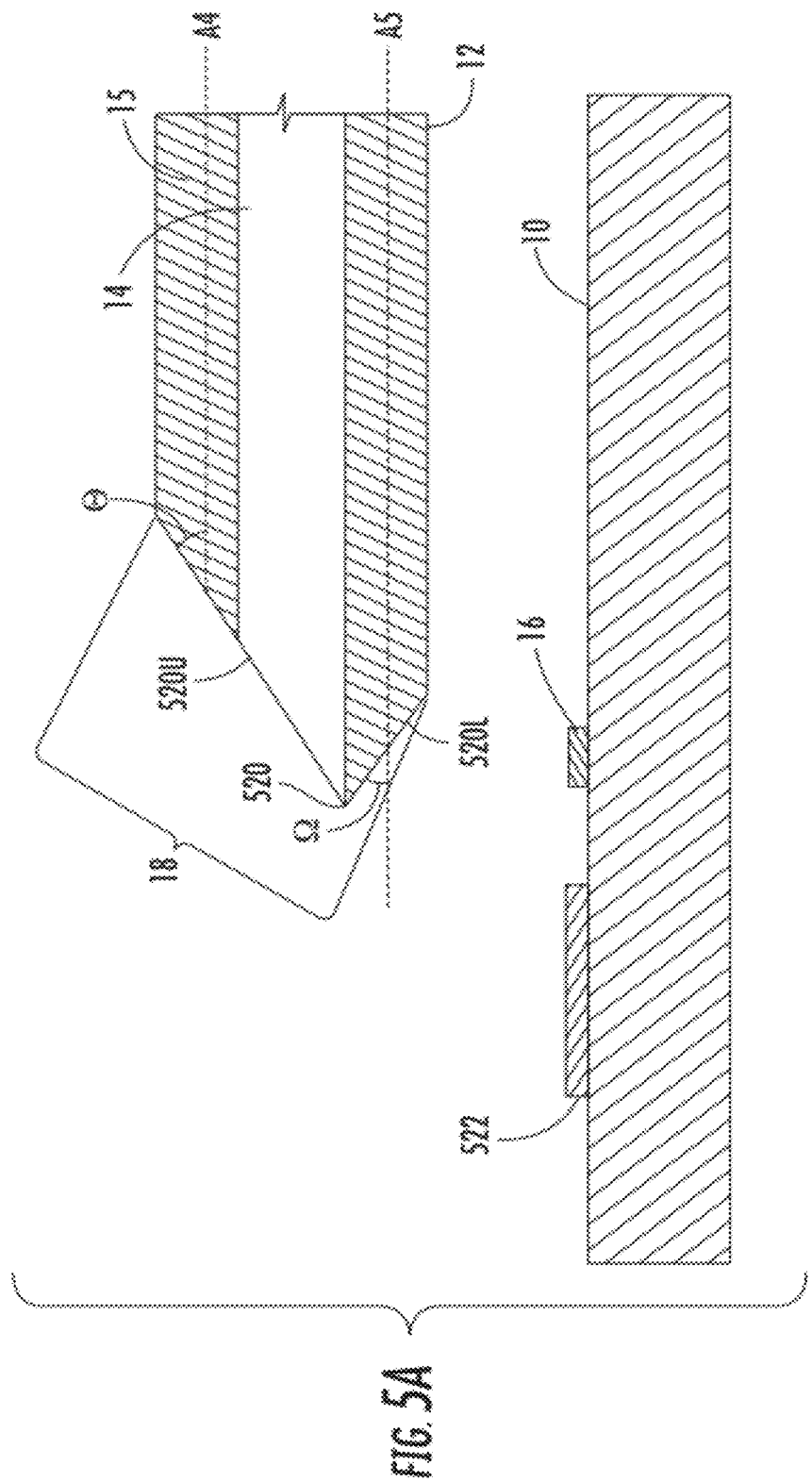
FIG. 5A is a cross-sectional side view of an exemplary embodiment of an optical fiber having two angle-cleaved facets disposed on an end of the optical fiber illustrating an alternate detector configuration.

In another embodiment, the laser-cleaved facets can be angled further such that the laser-cleaved facets both reflect and refract light from the optical light source via Fresnel reflection and refraction. FIG. 5A is a cross-sectional side view of an exemplary embodiment of an optical fiber having two angle-cleaved facets illustrating an alternate detector configuration. The optical fiber 12 having at one end an angled face having a plurality of cleaved facets, as shown in FIG. 5A, may also be used to split light from a light beam from an optical light source to a detector such that the light from the optical light source may be tapped off for monitoring purposes. An optical fiber 12 having an internal core 14 is positioned over an optical light source 16 on a substrate 10. An end 18 of the optical fiber 12 is laser angle-cleaved similar to the optical fiber 12 of FIGS. 3A, 3B, and 4, except that the laser-cleaved facets of the optical fiber 12 in FIG. 5A are cleaved at a sharper (i.e., more acute with respect to the longitudinal axis A1) angle.

In the embodiment of FIG. 5A, the optical fiber 12 is cleaved at an end 18 such that the optical fiber 12 has upper and lower cleaved facets 520U and 520L. The upper and lower cleaved facets 520U and 520L may be disposed or formed by making a pair of laser-cleaved cuts through a point on the end 18 of the optical fiber 12 using a $CO_2$ laser, as described above. In this embodiment, a first laser-cleaved cut may be at a first angle Θ with respect to a longitudinal axis A4 of the optical fiber 12 to form the upper cleaved facet 520U. A second laser-cleaved cut is then made in the opposite direction from the first cut, at a second angle Ω with respect to axis A5, to form the lower cleaved facet 520L. Axis A4 and axis A5 are parallel to each other and are parallel to a longitudinal axis of the optical fiber 12.

The angles Ω and Θ are chosen to be sharper angles (i.e., more acute) angles than α and β in FIG. 2A, or γ and φ in FIG. 3A. It should be understood that the order of the cuts are not important, and the first laser-cleaved cut could have been at angle Ω to form the lower cleaved facet 520L. In addition, other methods to form the upper and lower cleaved facets 520U and 520L may be used. At the end of the cleaving process, the optical fiber 12 in the embodiment illustrated in FIG. 5A has upper and lower cleaved facets 520U and 520L, such that the end of the optical fiber 12 below a point 520 is angled in one direction at Ω degrees with respect to axis A5, and the end of the optical fiber 12 above the point 520 is angled in the opposite direction at Θ degrees with respect to axis A4. The sharper (i.e., more acute) angles Ω and Θ at which the end 18 of the optical fiber 12 is cleaved in FIG. 5A results in an end 18 of the optical fiber 12 that is more pointed. In addition, the upper and lower cleaved facets 520U and 520L will be longer (i.e., there will be more surface area on the upper and lower cleaved facets 520U and 520L). This allows the laser-cleaved facets 520U and 520L to be disposed or formed such that they both reflect and refract light from the optical light source via Fresnel reflection and refraction, as seen in FIG. 5B, and as discussed further below.

Figure 5B:
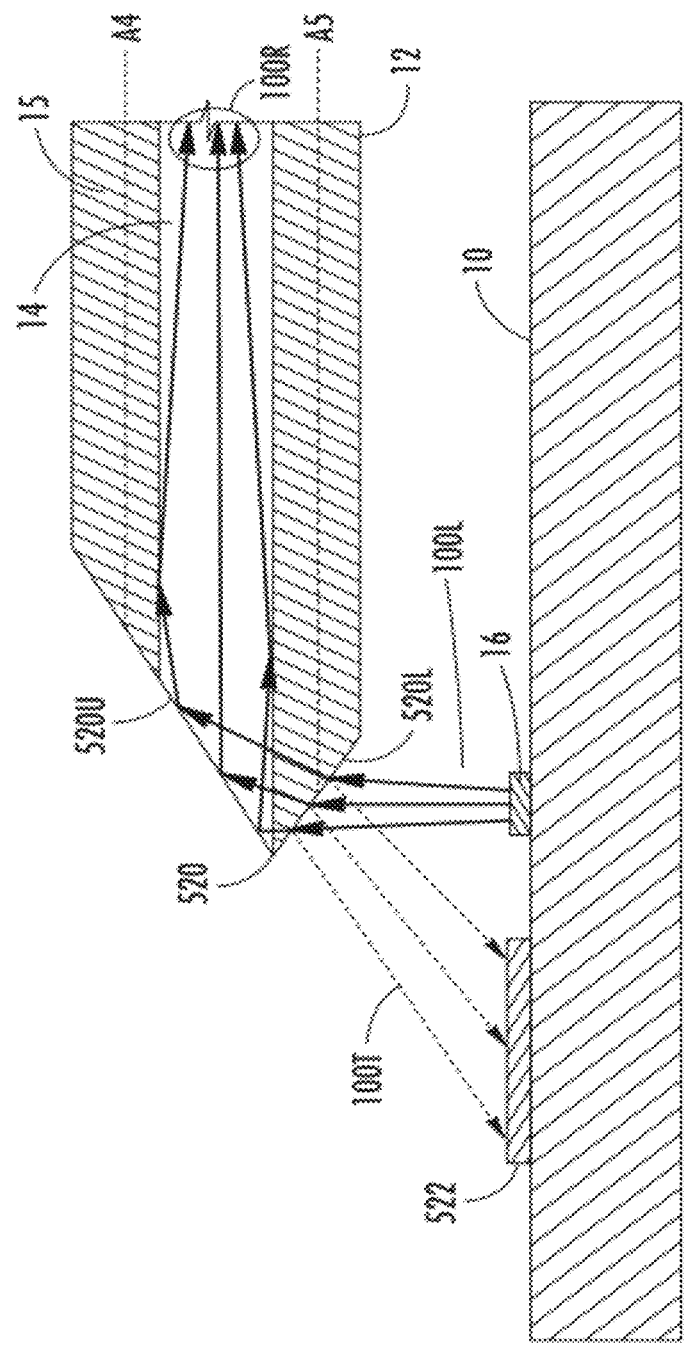
FIG. 5B is a cross-sectional side view illustrating an exemplary embodiment of the optical fiber of FIG. 5A splitting light from an optical light source onto a detector on a substrate where the optical light source is located.

FIG. 5B is a cross-sectional side view illustrating an exemplary embodiment of the optical fiber 12 of FIG. 5A splitting light from an optical light source onto a detector on a substrate where the optical light source is located. An optical fiber 12 having an internal core 14 is positioned over an optical light source 16 on a substrate 10 that also includes a detector 522. In FIG. 5B, a portion of the light 100L from the optical light source 16 is directed upwards toward the laser-cleaved end of the optical fiber 12. When the light 100L hits the lower cleaved facet 520L, a first portion of the light 100L is refracted through the lower cleaved facet 520L to the upper cleaved facet 520U. When that first portion of light 100L hits the upper cleaved facet 520U, it is then TIR reflected by the upper cleaved facet 520U into the internal core 14 of the optical fiber 12 as light 100R. The remaining, or second, portion of light 100L is reflected off the lower cleaved facet 520L and directed toward detector 522. In the embodiment of FIG. 5B, the detector 522 is located on the same substrate 10 as the optical light source 16 and may be positioned proximate the optical light source 16. The detector 422 may be positioned at any point on the substrate 10 in the path of the reflected light 100T from the lower cleaved facet 520L. The light 100T can then be used as an optical tap signal to monitor the light from the optical light source 16.

In the configurations provided above in FIGS. 2A-5B, the amount of light guided to the detector depends in part on the axial position of the optical fiber end 18 relative to the optical light source 16. For example, in FIG. 5B, if the optical fiber 12 is moved to the right even slightly, a portion of the light 100L from the optical light source 16 will miss the lower cleaved facet 520L completely and propagate upward. If the optical fiber 12 is positioned too far to the right, the light 100L from the optical light source 16 will fall on the curved bottom surface of the fiber instead of the lower cleaved facet 520L, causing light to be reflected along a path that misses the detector 522. The reflected light will also miss the detector 522 if the optical fiber 12 is laterally displaced (into or out of the page) during alignment. Therefore, the appropriate positioning of the end of the optical fiber 12 relative to the optical light source 16 can be determined during alignment using closed-loop feedback from the detector 522 when the optical light source 16 is activated.

To perform this closed-loop feedback alignment process, the optical fiber 12 is inserted from the right until the laser-cleaved end of the optical fiber 12 is aligned to the optical light source 16. In this process, the optical light source 16 may be in the form of an active optical component, such as a VCSEL. The alignment method involves activating the optical light source 16 and adjusting the position of the optical fiber 12 until power is maximized at the detector 522.

In some laser coupling applications, it is desirable to provide a fixed optical attenuation between the laser source and the optical fiber. The same optical fiber alignment process described above may be used to limit the power coupled into the optical fiber. For example, when the optical fiber 12 is moved left or right in FIG. 5B, the amount of light 100R that is TIR reflected into the internal core 14 is expected to vary. Therefore, a specific optical attenuation for light from the optical light source 16 is easily set at the time of manufacture by adjusting the final position of the end of the optical fiber 12 relative to the optical light source 16.

Figure 6:
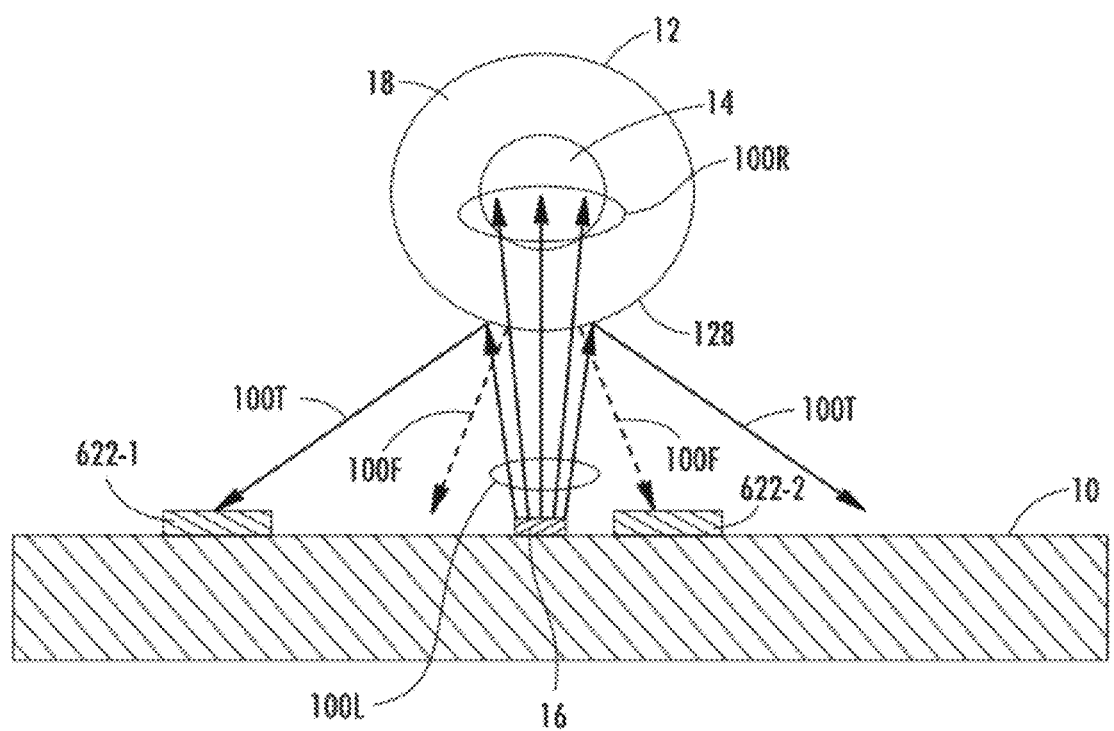
FIG. 6 is a cross-sectional end view of an exemplary embodiment of light reflected off the bottom surface of an optical fiber.

In another embodiment, such as the one shown in FIG. 6, the power of the optical light source may be monitored by detecting light that reflects off the bottom surface of the optical fiber. The detector is mounted on the same substrate as the VCSEL device. Light may be TIR reflected off the bottom surface of the fiber or Fresnel reflected, depending on the angle of incidence of VCSEL light on the bottom surface. As described above, closed-loop fiber alignment (at least in the lateral direction) may be employed during assembly by monitoring scattered power off the bottom surface of the fiber.

FIG. 6 is a cross-sectional end view of an exemplary embodiment of an optical fiber, wherein light is reflected off the bottom surface of the optical fiber. An optical fiber 12 having an internal core 14 is positioned over an optical light source 16 on a substrate 10. In one embodiment, the optical fiber 12 may have a cleaved fiber end 18, as shown in FIG. 6 and previously discussed with respect to FIG. 1. In another embodiment, the fiber end 18 may be polished using known polishing techniques. In other embodiments, the optical fiber 12 may have multiple cleaved facets, as shown in FIGS. 2A-5B. One or more detectors are disposed on the substrate 10. In the embodiment of FIG. 6, two detectors, a first detector 622-1 and a second detector 622-2, are located on the substrate 10.

Light 100L is launched from the optical light source 16. A portion of light 100L is TIR reflected off the cleaved fiber end 18 as light 100R into the internal core 14 of the optical fiber 12. Other portions of the light 100L may be TIR reflected off the bottom surface of the optical fiber 12 as light 100T. Still other portions of the light 100L may be Fresnel reflected off the bottom surface of the optical fiber 12 as light 100F. Whether the light 100L is TIR reflected or Fresnel reflected off the bottom surface of the optical fiber 12 depends on the angle of incidence of the light 100L as it strikes the bottom surface of the optical fiber 12 and is governed by Snell's Law. The portion of the light 100L that strikes the bottom of the optical fiber 12 at an angle above a certain critical angle is totally internally reflected as light 100T. The remainder of the light 100L is Fresnel reflected as light 100F. The light 100T that is TIR reflected off the bottom surface of the optical fiber 12 may be directed toward the detector 622-1. The light 100F that is Fresnel reflected off the bottom surface of the optical fiber 12 may be directed toward the detector 622-2.

In the embodiment of FIG. 6, the detectors 622-1 and 622-2 may be located on the same substrate 10 as the optical light source 16. The detectors 622-1 and 622-2 may be positioned at any point on the substrate 10 in the path of the reflected light 100T that is TIR reflected off the bottom surface of the optical fiber 12 or in the path of the reflected light 100F that is Fresnel reflected off the bottom surface of the optical fiber 12. The detectors 622-1 and 622-2 may be positioned proximate the optical light source 16. The light 100T and/or 100F can then be used as an optical tap signal to monitor the light from the optical light source 16.

As described above, the embodiment of FIG. 6 may also be used to perform closed-loop optical fiber alignment during assembly, at least in the lateral direction, by monitoring the scattered power of the light reflected off the bottom surface of the optical fiber 12.

As discussed above, the laser-cleaved fiber ends disclosed herein may be disposed or formed on individual fibers or arrays of fibers. Single or multiple laser-cleaved facets may be disposed or formed on the ends of arrayed optical fibers in addition to individual optical fibers. An optical fiber array may be comprised of optical fibers each having an outer surface, an internal core, and a cleaved (e.g., laser-cleaved) fiber end with one or more laser-cleaved facets of the type disclosed herein. In addition, the substrate 10 disclosed herein may be a channeled substrate such that the laser-cleaved fibers may be inserted into channels in a channeled substrate. In an example embodiment, the optical fiber array may comprise an optical fiber cable such as a ribbon fiber cable. The pointed, or angled, shapes of the laser-cleaved fiber ends facilitate insertion of the optical fiber(s) into the channels of the substrate.

For certain optical light sources, such as light sources in the form of VCSEL-based transmitters, it is often desirable to operate the component at high optical output power levels. Since eye safety requirements place a limit on the maximum optical power carried in an optical link, it is sometimes necessary to attenuate the optical power launched into the optical fibers. Control of the optical power is accomplished in one example by providing a known optical attenuation between the optical light source 16 and the optical fiber 12, or by positioning (i.e., selectively aligning) the optical fiber 12 so that it only captures a fraction of the light outputted by the optical light source 16.

In summary, an optical assembly configuration is disclosed in which a portion of light from an optical light source is refracted or reflected by one of two or more angled-cleaved fiber end facets into a detector. By using the optical fiber having multiple cleaved facets, a tap monitor for monitoring light from an optical light source is accomplished without having to coat the ends of the optical fiber.

In addition, various techniques have been described for the active alignment of optical fibers to optical light sources. One technique described herein involves measuring the amount of power coupled into the optical fiber at one end, and adjusting the position of the optical fiber relative to the optical light source until the received power is maximized.

Using the optical fiber having multiple cleaved facets to tap off light to monitor light from an optical light source has other advantages. The tap ratio (i.e., the power of the light split off at the tap versus the total amount of light launched from the optical light source into the optical fiber) can be set at the time of assembly by selecting appropriate fiber end facet angles. When tapping off light for monitoring purposes, the tap ratio is generally desired to be as small as possible. Using the angled-cleaved optical fibers disclosed herein allows the tap ratio to be set between 1% and 5% in one embodiment. In addition, the tap ratio can be fine-tuned at the time of assembly by adjusting the position of an end of the optical fiber relative to the optical light source.

Active monitoring of the tapped power during positioning of the optical fiber in an optical assembly can also be used to provide positional feedback during assembly. Moreover, adjusting the angles and positions of the cleaved facets of the end of the optical fiber, or adjusting the position of the end of the optical fiber relative to the optical light source, can also be used to variably attenuate the power of the optical light source.

Another advantage of using the cleaved optical fibers to monitor the light from an optical light source is the low cost, since no additional parts are required due to the device used to split off the light for the tap monitor being integrated into the cleaved end of the optical fiber.

Further, as used herein, it is intended that the terms "fiber optic cables" and/or "optical fibers" include all types of single mode and multi-mode light waveguides, including one or more bare optical fibers, loose-tube optical fibers, tight-buffered optical fibers, ribbonized optical fibers, bend-insensitive optical fibers, or any other expedient of a medium for transmitting light signals. An example of a bend-insensitive optical fiber is ClearCurve® optical fiber, manufactured by Corning Incorporated.

Many modifications and other embodiments set forth herein will come to mind to one skilled in the art to which the embodiments pertain having the benefit of the teachings presented in the foregoing descriptions and the associated drawings. Therefore, it is to be understood that the description and claims are not to be limited to the specific embodiments disclosed and that modifications and other embodiments are intended to be included within the scope of the appended claims. It is intended that the embodiments cover the modifications and variations of the embodiments provided they come within the scope of the appended claims and their equivalents. Although specific terms are employed herein, they are used in a generic and descriptive sense only and not for purposes of limitation.

What is claimed is:

1. An angle-cleaved optical fiber apparatus comprising:
   an optical light source for emitting light;
   at least one optical fiber comprising a plurality of cleaved facets disposed at an end of the at least one optical fiber, wherein a first facet of the plurality of cleaved facets is disposed at a different angle with respect to a longitudinal axis of the at least one optical fiber than a second facet of the plurality of cleaved facets;
   wherein the end of the at least one optical fiber is positioned with respect to the optical light source such that:
      the second facet of the plurality of cleaved facets is configured to reflect a portion of light from the optical light source into an internal core of the at least one optical fiber; and
      the first facet of the plurality of cleaved facets is configured to refract a portion of the light from the optical light source onto a detector.

2. The apparatus of claim 1, wherein the second facet of the plurality of cleaved facets is disposed at an angle greater with respect to the longitudinal axis of the at least one optical fiber than an angle of the first facet of the plurality of cleaved facets.

3. The apparatus of claim 1, wherein the optical light source is disposed on a substrate having the optical light source for emitting light disposed thereon.

4. The apparatus of claim 1, wherein the detector is located above the at least one optical fiber.

5. The apparatus of claim 1, wherein the detector is located along the longitudinal axis of the at least one optical fiber at the end of the at least one optical fiber.

6. The apparatus of claim 1, wherein the detector is located on a substrate proximate the optical light source.

7. The apparatus of claim 1, wherein the second facet of the plurality of cleaved facets is angled in an opposite direction from the first facet of the plurality of cleaved facets.

8. The apparatus of claim 1, further comprising:
   a substrate having an optical light source for emitting light disposed thereon; and
   a molded cap having an interior reflecting surface;
   wherein the molded cap is positioned with respect to the end of the at least one optical fiber such that a portion of light from the optical light source is:
      reflected by the first facet of the plurality of cleaved facets onto the interior reflecting surface of the molded cap; and
      guided from the interior reflecting surface of the molded cap to a detector located on the substrate proximate the optical light source.

9. The apparatus of claim 8, wherein the interior reflecting surface of the molded cap is coated with a reflective or scattering material.

10. The apparatus of claim 1, further comprising a substrate having the optical light source for emitting light disposed thereon,
   wherein the plurality of cleaved facets are angled such that:
      a first portion of light from the optical light source is configured to be refracted by the first facet of the plurality of cleaved facets to the second facet of the plurality of cleaved facets, which then reflects the first portion of light into the internal core of the at least one optical fiber; and
      a second portion of light from the optical light source is configured to be reflected by the first facet of the plurality of cleaved facets to the detector located on the substrate proximate the optical light source.

11. A method of monitoring an optical light source, comprising:
   directing light from the optical light source to an optical fiber having at least one angle-cleaved fiber end, wherein the optical fiber further comprises a plurality of cleaved facets disposed at the at least one angle-cleaved fiber end of the optical fiber;
   refracting a first portion of the light from the optical light source by a first facet of the plurality of cleaved facets to a second facet of the plurality of cleaved facets, which then reflects the first portion of light into an internal core of the optical fiber;
   reflecting a second portion of light outside of the optical fiber from the optical light source by the first facet of the plurality of cleaved facets to a detector; and
   detecting light reflected outside of the optical fiber by the at least one angle-cleaved fiber end of the optical fiber at the detector.

12. The method of claim 11,
   wherein the first facet of the plurality of cleaved facets is formed at a different angle with respect to a longitudinal axis of the optical fiber than the second facet of the plurality of cleaved facets.

13. The method of claim 12, wherein the second facet of the plurality of cleaved facets is formed at an angle greater with respect to the longitudinal axis of the optical fiber than an angle of the first facet of the plurality of cleaved facets.

14. The method of claim 12 further comprising:
   positioning the at least one angle-cleaved fiber end of the optical fiber with respect to the optical light source such that one of the plurality of cleaved facets is configured to reflect a portion of light from the optical light source onto the detector.

15. The method of claim 12, further comprising:
   positioning a molded cap having an interior reflecting surface with respect to the at least one angle-cleaved fiber end of the optical fiber such that a portion of light from the optical light source is:
      reflected by one of the plurality of cleaved facets onto the interior reflecting surface of the molded cap; and
      guided from the interior reflecting surface of the molded cap to the detector.

16. The method of claim 12, further comprising:
   measuring a power of the light detected at the detector; and
   aligning the at least one angle-cleaved fiber end of the optical fiber with the optical light source based on the power of the light detected at the detector.

17. The method of claim 12, further comprising:
   measuring a power of the light detected at the detector; and
   attenuating the light from the optical light source based on the power of the light detected at the detector.

* * * * *